Oct. 1, 1968   R. SERVADIO   3,403,901
SCREW CLAMP
Filed Sept. 2, 1965
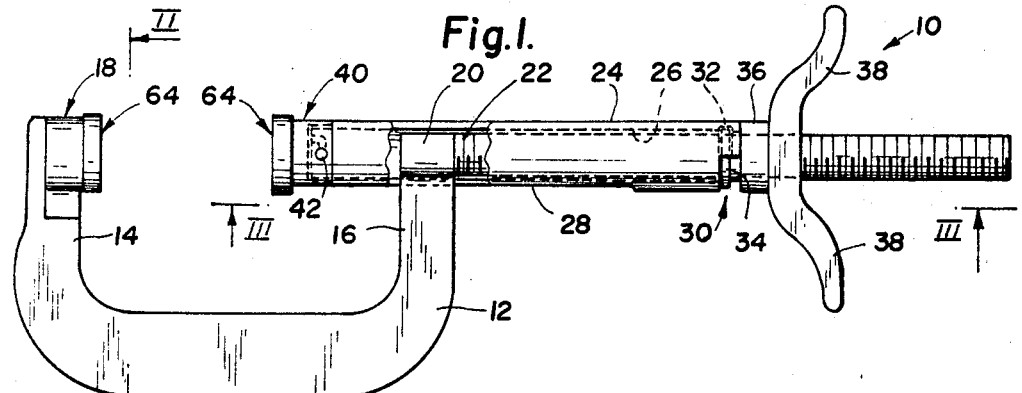
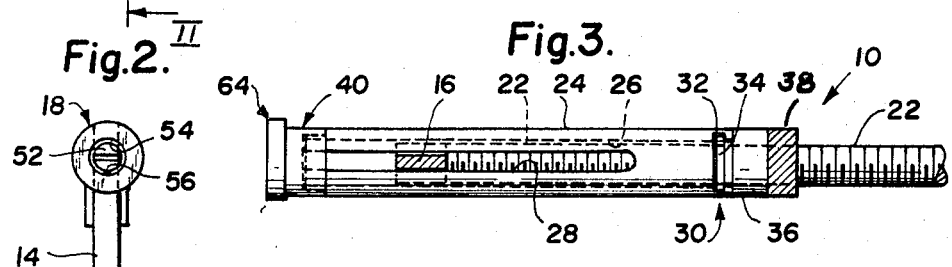
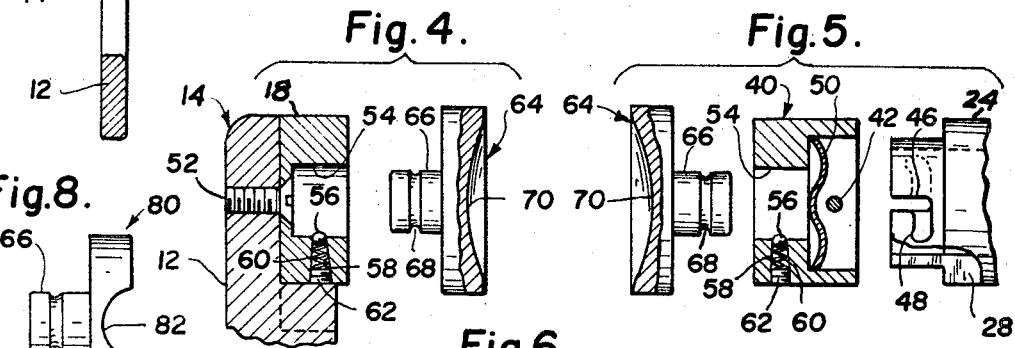
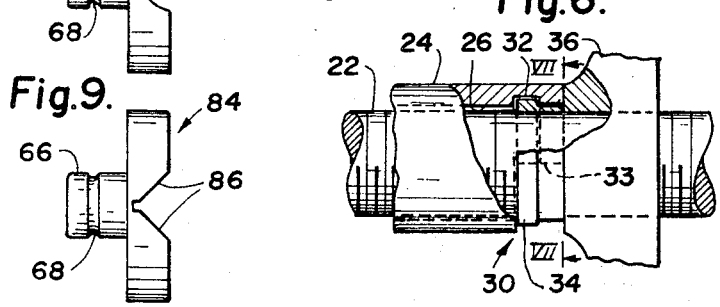
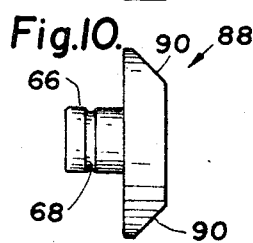
INVENTOR.
ROBERT SERVADIO
BY
*William J. Ruano*
his ATTORNEY United States Patent Office 3,403,901
Patented Oct. 1, 1968

3,403,901
SCREW CLAMP
Robert Servadio, 3721 Park View Ave.,
Pittsburgh, Pa. 15213
Filed Sept. 2, 1965, Ser. No. 484,586
4 Claims. (Cl. 269—243)

ABSTRACT OF THE DISCLOSURE

A screw clamp comprising a substantially C-shaped frame, a clamping jaw secured to the extremity of one leg of the frame and a screw integrally secured to the extremity of the other leg, a sleeve fitted about the screw with a slot surrounding one leg, and a separate handle screw threaded to the screw and detachably secured to the end of the sleeve in a manner so as to always move with the sleeve, that is, when the handle is turned in one direction or in opposite direction. Detachable work holders or dies are provided and so shaped to enable the work to be selectively held so as to be rotated, or, by tighter clamping, firmly held against rotation.

---

This invention relates to improvements in a screw clamp and, more particularly, to a clamp having a substantially C-shaped frame.

An outstanding disadvantage of conventional screw clamps of the C-shaped frame type is that generally the screw or threaded rod is turned, having a universal jointed clamping jaw at one end which has the disadvantage of gouging or scratching the work piece clamped and not providing assured and complete frictional contact on opposite surfaces of the work piece.

Another disadvantage is that the work piece cannot be rotated about the axis of the screw to adjust its position, and when this is attempted, further gouging or scratching of the work piece occurs as well as unloosening of the work piece from the clamp. A still further disadvantage is that it is impossible to clamp work pieces having odd shapes that is, other than flat pieces, because of the lack of an assured grip therewith.

An object of my invention is to provide a novel screw clamp of the C frame type which is devoid of the above-named disadvantages and which enables secure clamping of a work piece of any shape, even spherical, in a manner that it may be selectively rotated about the axis of the screw or firmly held, as desired, by merely varying the pressure of the handle.

A more specific object of my invention is to provide a novel C-shaped screw clamp which embodies clamping jaws which are detachably fastened to the extremities of the legs of the clamp in a manner so as to permit rotation along the axis of the screw to permit adjustment of the work piece, and wherein the screw is stationary and a surrounding sleeve for supporting one of the jaws is propelled longitudinally as a consequence of rotational movement of a winged handle, screw threaded to said screw.

Other objects and advantages of the present invention will become apparent from a study of the following specification, taken with the accompanying drawing wherein:

FIG. 1 is an elevational view, shown partly cutaway, of a screw clamp embodying the principles of the present invention;

FIG. 2 is a cross-sectional view taken along line II–II of FIG. 1;

FIG. 3 is a cross-sectional view taken along line III–III of FIG. 1;

FIG. 4 is an enlarged, fragmentary exploded view of one of the clamping jaws and sockets shown at the left of FIG. 1;

FIG. 5 is an enlarged, fragmentary exploded view of the other clamping jaw shown in FIG. 1;

FIG. 6 is an enlarged, fragmentary view showing the connection between the wing-shaped handle 38 and sleeve 24 of FIG. 1;

FIG. 7 is a cross-sectional view taken along line VII–VII of FIG. 6; and

FIGS. 8, 9 and 10 show various modifications of the clamping jaw 64 shown in FIG. 1.

Referring more particularly to FIGS. 1, 2 and 3 of the drawing, numeral 10 generally denotes a screw clamp having a substantially C-shaped frame 12 and embodying the principles of the present invention.

Frame 12 has integral legs 14 and 16 at the extremities of which are secured suitable supports or sockets for detachably supporting clamping jaws 64.

An important feature of the present invention resides in the manner that clamping movement of the jaws is effected. Instead of turning a screw by means of an integral handle, as in conventional C-shaped clamps, the screw 22 is stationarily held by being integrally secured to the extremity 20 of leg 16 of the C-shaped frame 12. A sleeve 24 surrounds and is slightly spaced from said screw 22 in non-threaded relationship. This sleeve is provided with a longitudinal slot 28 which cooperates with the leg 16 of the frame 12, as shown more clearly in FIG. 3, so as to prevent rotation of the sleeve as it is pushed to the left, as viewed in FIG. 1, by turning of the wing-shaped handle 38. The handle 38 has an internally threaded hole serving as an integral nut portion screw threaded to the screw 22, and has an integral boss 36 which is adapted to push against the end of the sleeve as the handle 38 is turned in screw threaded relationship with screw 22.

In order to mechanically couple handle 38 to the end of sleeve 24 so that the two will always move together as a unit, an integral collar portion 32 is provided on boss 36 of the handle (see FIG. 6) which seats in a circumferential groove 32 formed on the inner surface 26 of sleeve 24. In order to permit initial coupling of handle 38 and sleeve 24, a substantially semi-circular cut-out portion 30 is provided extending between the end walls 33, as shown more clearly in FIGS. 6 and 7. Thus, the collar 32 may be introduced into sleeve 24 initially by sliding it radially through the semi-circular groove or cut-out portion 30 of the sleeve 24. Of course, if it is not desired to couple the handle 38 with the sleeve 24, the integral collar 34 may be omitted, as well as the groove 32, in which event the end of boss 36 will push against the sleeve 24, but may be separated therefrom by unscrewing of the handle 38.

At the left end of frame 12, as viewed in FIG. 1, there is provided a socket 18 which is rigidly fastened to the leg 14 by any suitable fastening means, such as a machine screw 52 (see FIG. 4) seated at the bottom of a bore or well portion 54. Extending radially inwardly from socket 18 is a ball 56 held in a tapered radial hole in which is held in place by a screw threaded plug 62. Clamping jaw 64 is of disc shape and may be provided with either a flat outer surface or a cupped outer surface 70, as shown in FIGS. 4 and 5. Each clamping jaw 64 has an integral pin or plug portion 66 having a peripheral groove 68, whereby when the plug 66 is pushed into the well 54, the ball 56 will snap into engagement with groove 68 so as to lock jaw 64 to socket 18 but still permit rotational movement of the jaw 64 relative to the socket. A similar connection is provided between the confronting jaw 64 and socket 40 as shown more clearly in FIG. 5. This particular socket 40 is provided with a well portion containing a flat spring 50 and having a diametrically extending pin 42, which pin is adapted to be slipped into the diametrical slot 46 at the end of sleeve 24 and upon turning of said pin 42, fit into a bayonet slot 48 in the sleeve, against the action of spring 50.

The die clamping jaws 64 of FIG. 1 generally will be provided with confronting flat, parallel surfaces, so that an object may be clamped therebetween having a flat shape, and which may be easily turned when clamped by not turning handle 38 too tightly. But when it is desired to prevent free rotation of the work while clamped between jaws 64, handle 38 is screwed very tightly to completely prevent such rotation.

When it is desired to clamp a sphere or perhaps a pair of spheres together, spherical seats 70, as shown in FIGS. 4 and 5, and provided in the confronting surfaces of the jaws.

Still other shapes may be formed in the clamping jaws. For example, in FIG. 8, jaw 80 is provided with a semicircular seat 82 for holding a pipe or cylinder. In FIG. 9 clamping jaw 84 is provided with angularly disposed flat surfaces 86 so as to hold an angle iron while the confronting jaw 84, similarly grooved, is holding another angle iron such as when it is desired to weld the extremities of the angle irons together to form a rectangular channel element.

FIG. 10 shows a further modification of jaw 88 having a truncated, cone shaped periphery for holding similarly shaped articles. And, of course, other shapes of seats may be provided, depending on the shape of the work being clamped.

Thus, it will be seen that I have provided a highly efficient screw clamp of the C-shaped frame type, embodying a stationary screw element about which is freely fitted a sleeve which is propelled solely by pushing movement exercised by a handle turned in screw threaded engagement with the screw, toward and away from the work to be clamped; furthermore, I have provided a novel clamp in which the jaws permit free rotation of the work about the axis of the screw, when clamped and upon further tightening of the handle, prevents such rotation; furthermore, I have provided novel clamping jaws which may be easily detached and replaced by other clamping jaws with other shaped surfaces for seating of work of any corresponding shape; furthermore, I have provided a novel clamp construction that clamps together work pieces of such shape as cannot be clamped by a conventional C clamp, such as clamping two balls or two angle irons together tightly; furthermore, it should be noted that the dies may be made of longer and varying lengths if the work includes long flanges, such as in channels, as in truck frames, angles or I beams, the extra length compensating for the flange length.

While I have illustrated and described a specific embodiment of my invention, it will be understood that this is by way of illustration only, and that various changes and modifications may be made within the contemplation of my invention and within the scope of the following claims.

I claim:

1. A screw clamp comprising a substantially C-shaped frame terminating in two legs, a clamping jaw secured to the extremity of one of said legs, a screw integrally secured to the extremity of the other of said legs in alignment with said jaw, a sleeve fitted about said screw in spaced, non-threaded relationship, said sleeve having a substantially semi-circular end portion with a circumferential groove along the inner surface thereof, said sleeve having a longitudinal slot surrounding said other of said legs, and a separate handle screw threaded to said screw and having an integral collar portion fitted into said groove so as to mechanically couple said handle to said sleeve so as to move therewith irrespective of the direction of rotation of said handle as it propels the sleeve longitudinally without turning and as guided by said last mentioned leg and slot, and a clamping jaw secured to the other end of said sleeve.

2. A clamp as recited in claim 1 wherein at least one of said jaws comprises a socket detachably secured to the extremity of the corresponding leg of said clamp and a seating portion cut out of said jaw in a manner to fit and permit rotation of the work held thereby.

3. A clamp as recited in claim 1 wherein each of said clamping jaws comprises a socket rigidly secured to the corresponding leg of said frame, which socket is provided with a radially inwardly projecting spring biased locking element, and a clamping element provided with a plug portion having a circumferential groove for snap engagement with said spring biased locking element.

4. A clamp as recited in claim 3 wherein an end of said sleeve is provided with a bayonet slot fitting for detachable connection with one of said sockets.

References Cited

UNITED STATES PATENTS

| 234,091 | 11/1880 | Thompson | 81—174 |
| 2,205,674 | 6/1940 | Schroeder | 269—249 |
| 2,383,591 | 8/1945 | Cox | 269—249 X |

FOREIGN PATENTS

| 1,141,155 | 3/1957 | France. |
| 524,096 | 4/1955 | Italy. |

ROBERT C. RIORDON, *Primary Examiner.*

J. F. McKEOWN, *Assistant Examiner.*